H. JOHNSON.
CULTIVATOR ATTACHMENT.
APPLICATION FILED APR. 24, 1918.
1,289,796.
Patented Dec. 31, 1918.
2 SHEETS—SHEET 1.
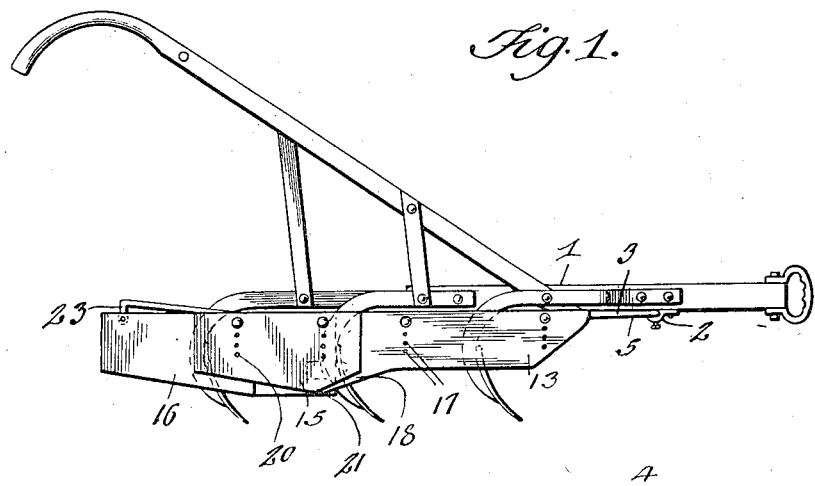
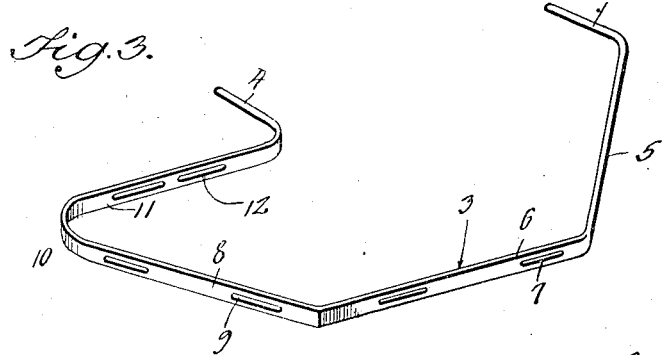
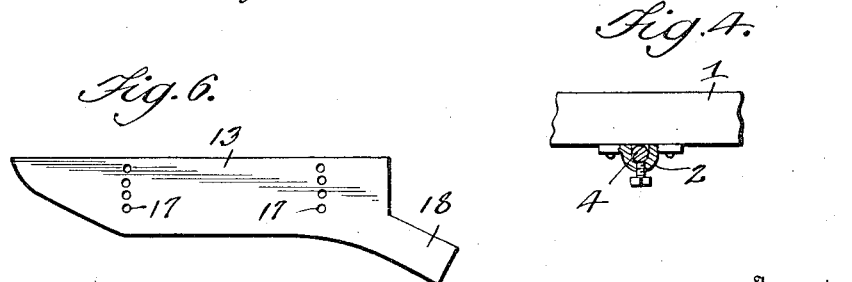
WITNESSES
E. A. Deeson Jr.
O. Wilcox
Inventor
H. Johnson,
By Victor J. Evans
Attorney H. JOHNSON.
CULTIVATOR ATTACHMENT.
APPLICATION FILED APR. 24, 1918.
1,289,796.
Patented Dec. 31, 1918.
2 SHEETS—SHEET 2.
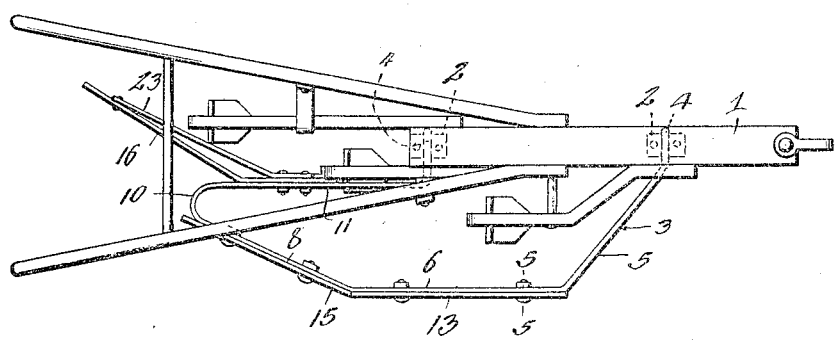
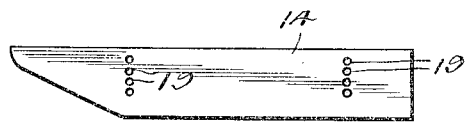
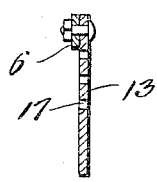
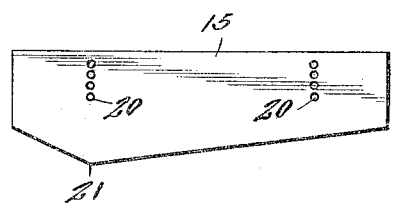
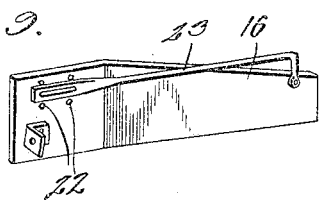
Inventor
H. Johnson,
By Victor J. Evans
Attorney
Witnesses

UNITED STATES PATENT OFFICE.

HUGH JOHNSON, OF REIDSVILLE, NORTH CAROLINA.

CULTIVATOR ATTACHMENT.

1,289,796.    Specification of Letters Patent.    Patented Dec. 31, 1918.

Application filed April 24, 1918. Serial No. 230,530.

*To all whom it may concern:*

Be it known that I, HUGH JOHNSON, a citizen of the United States, residing at Reidsville, in the county of Rockingham and State of North Carolina, have invented new and useful Improvements in Cultivator Attachments, of which the following is a specification.

This invention relates to cultivator attachments and it consists in the novel features hereinafter described and claimed.

An object of the invention is to provide an attachment of simple and durable structure adapted to be applied to the beam of a cultivator and adapted to carry plates which may be used to advantage during the cultivation of growing crops as for instance tobacco, corn and hops.

With this object in view the attachment comprises a bar having end portions adapted to be connected with the cultivator and intermediate portions adapted to extend along and across the standards of the cultivator. The intermediate portions are disposed at appropriate angles with relation to each other and are provided with slots through which bolts may be inserted for securing the plates in position upon the bar to permit the plates to properly operate in the soil adjacent the row of plants and to properly pass the soil during the cultivating operation.

In the accompanying drawings:

Figure 1 is a side elevation of a cultivator with the attachment applied.

Fig. 2 is a top plan view of the same.

Fig. 3 is a perspective view of the bar of the attachment.

Fig. 4 is a detailed sectional view through one of the clips of the attachment.

Fig. 5 is a transverse sectional view of one of the plates of the attachment cut on the line 5—5 of Fig. 2.

Fig. 6 is a side elevation of a forward plate used on the attachment.

Fig. 7 is a side elevation of the modified form of the plate which may be used upon the attachment.

Fig. 8 is a side elevation of a plate which is used at the intermediate portion of the attachment.

Fig. 9 is a perspective view of a plate which is used at the rear portion of the attachment.

As illustrated in the accompanying drawings the cultivator 1 is of usual pattern. The attachment comprises clips 2 which are applied to the under sides of the beams of the cultivator at spaced points. A bar 3 is provided with parallel extremities 4 which are adapted to be received in the clips 2 and may be secured therein by means of set-screws or other suitable devices. The forward portion 5 of the bar 3 is outwardly and rearwardly disposed and merges with an angularly disposed portion 6 which is provided with slots 7. The portion 6 merges with a portion 8 which lies approximately parallel with the median longitudinal dimension of the beam of the cultivator. The portion 8 is provided with slots 9. At its rear end the portion 8 merges into a portion 10 which is forwardly disposed from the rear end of the portion 8 and which at its forward end merges with a portion 11 having slots 12. The portion 11 is disposed parallel to the median longitudinal dimension of the beam of the cultivator when the bar is applied thereto.

The attachment also includes plates 13, 14, 15, and 16. The plate 13 is provided with perforations 17 through which bolts may be inserted for securing the plates 13 upon the portion 6 by passing the said bolts through the slots 7. The plate 13 is provided at its rear end with a curved blade 18 the lower edge of which is downwardly and rearwardly inclined. The blade is adapted to cut an incision in the soil at a line approximately midway between two adjacent rows of plants. The forward portion of the plate 13 is chamfered at its lower edge thereby providing a point.

The plate 14 is provided with bolt perforations 19 adapted to receive bolts whereby the said plates 14 may be secured to the portion 15 or the portion 8 of the bar 3.

The plate 15 is provided with perforations 20 adapted to receive bolts whereby the said plates 13 may be secured to the portion 8 of the bar 3 immediately behind the plate 13 when the said plate 13 is used. One edge of the plate 15 is straight from end to end of the plate and the opposite edge of the said plate 15 is in the form of an angle as indicated at 21. This plate may be reversed so that its straight edge may operate in the soil or the angle edge 21 operate in the soil as desired. The plates 15 and 16 are adapted to move the soil toward one row of plants.

The plate 16 is adapted to be connected with the portion 11 of the bar 3 and the said plate is provided at its forward portion with bolt perforations 22 adapted to receive bolts which may pass through the slots 12 and thereby secure the plate 16 to the portion 11 of the bar 3.

The plate 16 is provided with angularly disposed end portions and a rod 23 is secured at its rear end to the upper portion of the rear part of the plate and the said rod 23 is secured at its forward end at one of the forward perforations 22 in the plate by means of one of the bolts which assist in holding the plate in position upon the portion 11 of the bar 3. The rod 23 serves as a brace for holding the said angularly disposed parts at proper position with relation to each other.

When the attachment is used for cultivating growing crops it will be observed that the plates are susceptible of various adjustments in order to meet the conditions which exist about the crop and in order to cast the soil in desired or predetermined directions. Therefore the plates may be adjusted to especially adapt the cultivator to be used to advantage for cultivating crops of different character as for instance cotton, corn or tobacco.

Having described the invention what is claimed is:

In combination with a cultivator having a beam and standards, a bar connected at its ends with the beam, said bar being projected outwardly and rearwardly from the front standard, then parallel with the rear portion of the second standard for a part of its length then inward and having a curved and bended portion, then projected forwardly beside the second standard and plates detachably connected with the bar.

In testimony whereof I affix my signature.

HUGH JOHNSON.

Copies of this patent may be obtained for five cents each, by addressing the "Commissioner of Patents, Washington, D. C."